US012584765B2

(12) United States Patent
Fregnani et al.

(10) Patent No.: US 12,584,765 B2
(45) Date of Patent: Mar. 24, 2026

(54) MONITORING FOR UNSTABLE APPROACH OF AIRCRAFT USING SPECIFIC ENERGY

(71) Applicant: THE BOEING COMPANY, Arlington, VA (US)

(72) Inventors: José A. Fregnani, São José dos Campos (BR); Maxim Constantijn Vos, Madrid (ES); Geun I. Kim, Bothell, WA (US); Felipe Turetta, São José dos Campos (BR); Anselmo Eduardo Jorge Cortellazzi Filho, São Paulo (BR)

(73) Assignee: The Boeing Company, Arlington, VA (US)

( * ) Notice: Subject to any disclaimer, the term of this patent is extended or adjusted under 35 U.S.C. 154(b) by 158 days.

(21) Appl. No.: 18/592,436

(22) Filed: Feb. 29, 2024

(65) Prior Publication Data

US 2025/0277676 A1     Sep. 4, 2025

(51) Int. Cl.
G01C 23/00 (2006.01)
B64D 43/02 (2006.01)

(52) U.S. Cl.
CPC ........... G01C 23/005 (2013.01); B64D 43/02 (2013.01)

(58) Field of Classification Search
CPC ....... G01C 23/005; G01C 23/00; B64D 43/02
USPC ......................................................... 701/16
See application file for complete search history.

(56) References Cited

U.S. PATENT DOCUMENTS

| | | | |
|---|---|---|---|
| 7,161,501 B1 | 1/2007 | Lynch et al. | |
| 9,082,301 B2 * | 7/2015 | Catalfamo | G08G 5/54 |
| 10,202,204 B1 * | 2/2019 | Daidzic | B64D 45/04 |
| 2020/0013295 A1 | 1/2020 | Moravek et al. | |

OTHER PUBLICATIONS

Leonardo Matoso de Abreu et al., Evaluating Unstable Approaches Scenarios With Specific Energy Method Applied to a Brazilian Airport, Sitraer Air Transportation Symposium, Oct. 18-20, 2023, UFSC Joinville, SC, Brazil, 13 pages.
International Air Transport Association, IATA, Unstable Approaches Risk Mitigating Efforts, Montreal, Canada: IATA 2021.
Flight Safety Foundation ALAR Approach and landing Accident Reduction Tool Kit, FSF ALAR Briefing Note 7.1—Stabilized Approach, Flight Safety Digest, Aug.-Nov. 2000, pp. 133-138.
Singh, Narendra P., Goh, S. K., & Alam, S. Real-time unstable approach detection using sparse variational Gaussian process. Proceedings of the 2020 International Conference on Artificial Intelligence and Data Analytics in Air Transportation (AIDA-AT), 2020, 11 pages.

(Continued)

*Primary Examiner* — Shardul D Patel

(74) *Attorney, Agent, or Firm* — Harrity & Harrity, LLP

(57) ABSTRACT

The present disclosure provides a method of monitoring for an unstable approach of an aircraft during flight in one aspect, the method including: determining, using values of a ground speed and a height of the aircraft derived from measurements acquired during the flight, a specific energy of the aircraft during an approach phase of the flight. The method further includes determining a reference specific energy of the aircraft, defining an energy range relative to the reference specific energy, and visually displaying, using a first flight instrument of the aircraft, an indicator of the specific energy relative to the energy range.

20 Claims, 7 Drawing Sheets

(56)         References Cited

OTHER PUBLICATIONS

Airbus, Safety First, Special Edition Control Your Speed Series, Feb. 2018, 64 pages.

International Air Transport Association, IATA. Unstable Approaches: Risk Mitigation Policies, Procedures and Best Practices, 3rd Edition, 2017, 52 pages.

Lai, HY; Chen, CH and Khoo, LP. Unstable Approach: Intervention and Prevention. Nanyang Technological University, Singapore. 2017, 11 pages.

https://aerospace.honeywell.com/US/en/products-and-services/product/hardware-and-systems/terrain-and-traffic-awareness/smartrunway-and-smartlanding, accessed Feb. 7, 2024.

https://www.navblue.aero/product/rops-plus/, accessed Feb. 7, 2024.

Extended European Search Report for European Application No. EP25151351.1 dated Oct. 28, 2025, 9 pages.

* cited by examiner

300

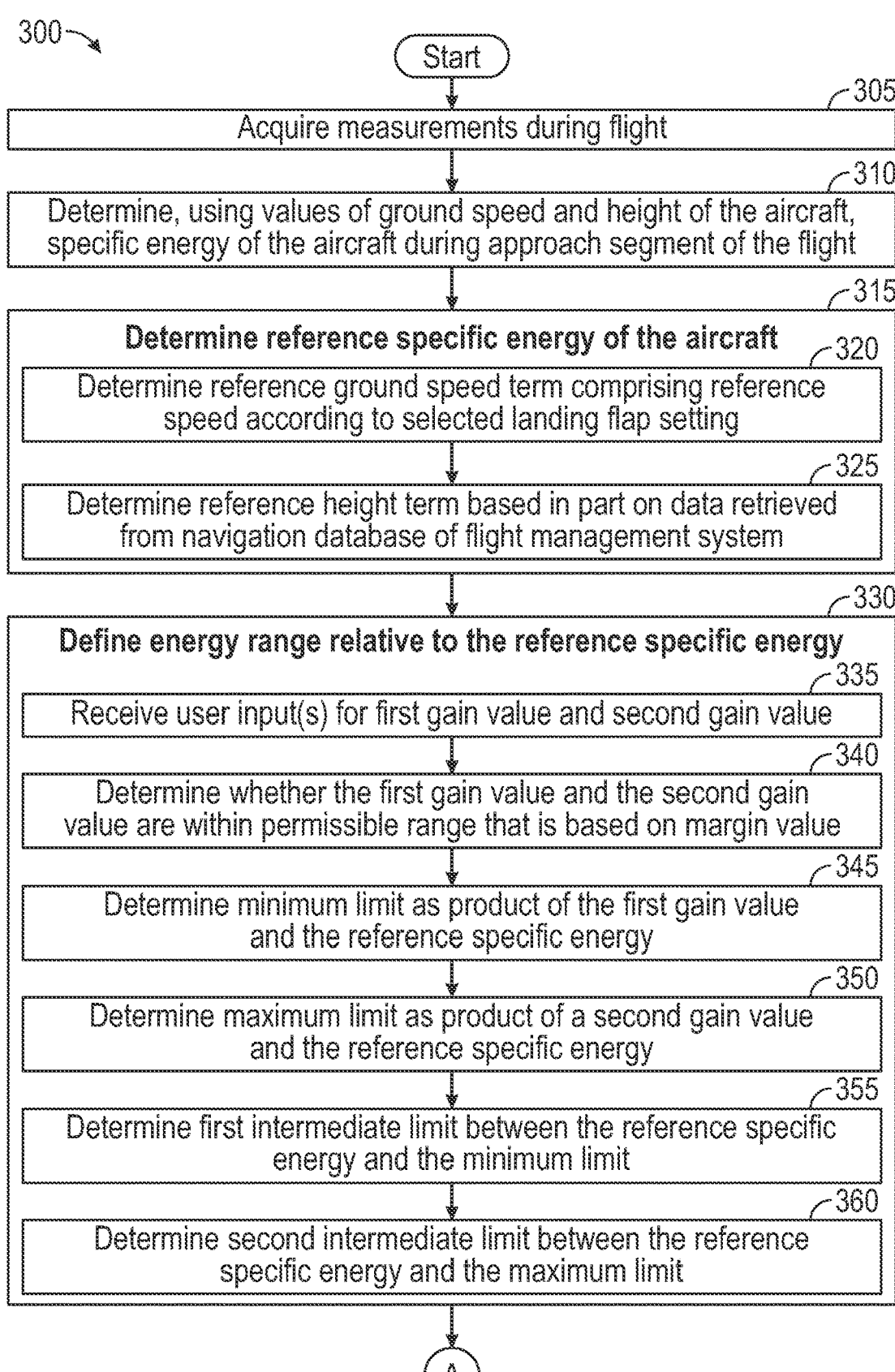

Start

305
Acquire measurements during flight

310
Determine, using values of ground speed and height of the aircraft, specific energy of the aircraft during approach segment of the flight 315
Determine reference specific energy of the aircraft

320
Determine reference ground speed term comprising reference speed according to selected landing flap setting 325
Determine reference height term based in part on data retrieved from navigation database of flight management system 330
Define energy range relative to the reference specific energy

335
Receive user input(s) for first gain value and second gain value

340
Determine whether the first gain value and the second gain value are within permissible range that is based on margin value 345
Determine minimum limit as product of the first gain value and the reference specific energy 350
Determine maximum limit as product of a second gain value and the reference specific energy 355
Determine first intermediate limit between the reference specific energy and the minimum limit 360
Determine second intermediate limit between the reference specific energy and the maximum limit

MONITORING FOR UNSTABLE APPROACH OF AIRCRAFT USING SPECIFIC ENERGY

FIELD

Aspects of the present disclosure relate to aircraft systems, and more specifically, techniques for identifying an unstable approach of an aircraft during flight, based on calculations of a specific energy of the aircraft.

BACKGROUND

When landing an aircraft, over-energy or low-energy conditions can occur when the flight crew does not properly manage aircraft altitude and/or speed through the approach phase of the flight. These factors result in unstable approaches of the aircraft, which correspond to an increased risk of runway excursions, tail strikes, hard landings, or runway undershoots. According to data from the International Air Transport Association (IATA), unstable approaches contributed to 26% of approach and landing accidents occurring between 2016 and 2020.

Most cases of unstable approaches result from excessive altitude and/or speed along a final approach segment of the approach phase (e.g., from the final approach fix to touchdown), even though the configuration of landing gear and landing flaps is technically correct. Typically, the pilot in command is responsible to identify that the aircraft is not meeting one or more criteria for a stable approach, and should perform a go-around and/or a missed approach procedure. The Flight Safety Foundation identifies the failure to identify the conditions for stabilized approach as one of the major causes of runway excursions.

SUMMARY

The present disclosure provides a method of monitoring for an unstable approach of an aircraft during flight in one aspect, the method including: determining, using values of a ground speed and a height of the aircraft derived from measurements acquired during the flight, a specific energy of the aircraft during an approach phase of the flight. The method further includes determining a reference specific energy of the aircraft, defining an energy range relative to the reference specific energy, and visually displaying, using a first flight instrument of the aircraft, an indicator of the specific energy relative to the energy range.

In one aspect, in combination with any example method above or below, the first flight instrument comprises a primary flight display (PFD), the indicator of the specific energy comprises a graphical element overlaid on a vertical crossbar of a flight director (FD) of the PFD, and one or both of a position and a color of the graphical element is based on the specific energy.

In one aspect, in combination with any example method above or below, the method further includes visually displaying, using a second flight instrument of the aircraft, an indicator of an actual indicated airspeed relative to a reference speed according to a selected landing flap setting.

In one aspect, in combination with any example method above or below, the second flight instrument comprises a primary flight display (PFD), the indicator of the actual indicated airspeed comprises an airspeed readout of an airspeed indicator of the PFD, and a color of the airspeed readout is based on the actual indicated airspeed.

In one aspect, in combination with any example method above or below, the method further includes visually displaying, using a third flight instrument of the aircraft, an indicator of a vertical speed.

In one aspect, in combination with any example method above or below, the third flight instrument comprises a primary flight display (PFD), the indicator of the vertical speed comprises one or both of a vertical speed readout and a vertical speed pointer of a vertical speed indicator of the PFD, and a color of the indicator is based on the vertical speed.

In one aspect, in combination with any example method above or below, the method further includes: comparing the specific energy with one or more limits of the energy range, and presenting, when the specific energy exceeds a limit of the energy range, an audiovisual warning using a fourth flight instrument of the aircraft.

In one aspect, in combination with any example method above or below, the audiovisual warning comprises a textual warning displayed on a scratchpad of the fourth flight instrument.

In one aspect, in combination with any example method above or below, the reference specific energy is a sum of a reference ground speed term, and a reference height term based on a threshold elevation.

The present disclosure provides a method of identifying an unstable approach of an aircraft, performed using a flight management system (FMS) of the aircraft, in one aspect, the method including: determining a reference specific energy of the aircraft. Determining the reference specific energy of the aircraft comprises: determining a reference ground speed term comprising a reference speed according to a selected landing flap setting; and determining a reference height term based in part on data retrieved from a navigation database of the FMS. The method further includes defining an energy range relative to the reference specific energy, and determining, using an actual height and an actual ground speed of the aircraft, a specific energy of the aircraft during an approach phase of the flight. The method further includes generating a signal to cause an indicator of the specific energy of the aircraft, relative to the energy range, to be visually displayed using a flight instrument of the aircraft.

In one aspect, in combination with any example method above or below, the reference specific energy comprises a sum of the reference ground speed term and the reference height term.

In one aspect, in combination with any example method above or below, the reference ground speed term comprises a sum of a reference speed according to a selected landing flap setting, a headwind term, and a speed adjustment term.

In one aspect, in combination with any example method above or below, the reference height term comprises one of the following: when a distance of the aircraft to a runway threshold is between a predetermined distance value and a final approach fix (FAF), a product of the distance and a tangent of an approach phase path angle, plus an altitude of the FAF, minus a threshold elevation, and when the distance is between the FAF and a point that is a predetermined height value above the runway threshold, a product of the distance and a tangent of a final approach path angle, minus the threshold elevation.

In one aspect, in combination with any example method above or below, defining the energy range comprises: determining a minimum limit as a product of a first gain value and the reference specific energy, and determining a maximum limit as a product of a second gain value and the reference specific energy.

In one aspect, in combination with any example method above or below, defining the energy range further comprises: receiving one or more user inputs for the first gain value and the second gain value, and determining whether the first gain value and the second gain value are within a permissible range that is based on a margin value.

In one aspect, in combination with any example method above or below, defining the energy range further comprises: determining a first intermediate limit between the reference specific energy and the minimum limit, and determining a second intermediate limit between the reference specific energy and the maximum limit. The method further includes generating a first signal to cause a flight instrument of the aircraft to present a first audiovisual warning responsive to the specific energy of the aircraft exceeding the first intermediate limit or the second intermediate limit, and generating a second signal to cause the flight instrument to present a second audiovisual warning responsive to the specific energy of the aircraft exceeding the minimum limit or the maximum limit.

The present disclosure provides a system in one aspect, the system including: one or more computer processors, and a memory storing instructions that when executed by the processor enable performance of an operation of identifying an unstable approach of an aircraft. The operation includes determining a reference specific energy of the aircraft. Determining the reference specific energy of the aircraft comprises: determining a reference ground speed term comprising a reference speed according to a selected landing flap setting, and determining a reference height term based in part on data retrieved from a navigation database. The operation further includes defining an energy range relative to the reference specific energy, and determining, using an actual height and an actual ground speed of the aircraft, a specific energy of the aircraft during an approach phase. The operation further includes generating a signal to cause an indicator of the specific energy of the aircraft, relative to the energy range, to be visually displayed using a flight instrument of the aircraft.

In one aspect, in combination with any example system above or below, the reference specific energy comprises a sum of the reference ground speed term and the reference height term.

In one aspect, in combination with any example system above or below, defining the energy range comprises: determining a minimum limit as a product of a first gain value and the reference specific energy, and determining a maximum limit as a product of a second gain value and the reference specific energy.

In one aspect, in combination with any example system above or below, the operation further includes: comparing the specific energy with one or more limits of the energy rang, and presenting, when the specific energy exceeds a limit of the energy range, an audiovisual warning using a second flight instrument of the aircraft.

BRIEF DESCRIPTION OF THE DRAWINGS

So that the manner in which the above recited features can be understood in detail, a more particular description, briefly summarized above, may be had by reference to example aspects, some of which are illustrated in the appended drawings.

DETAILED DESCRIPTION

Figure 1:
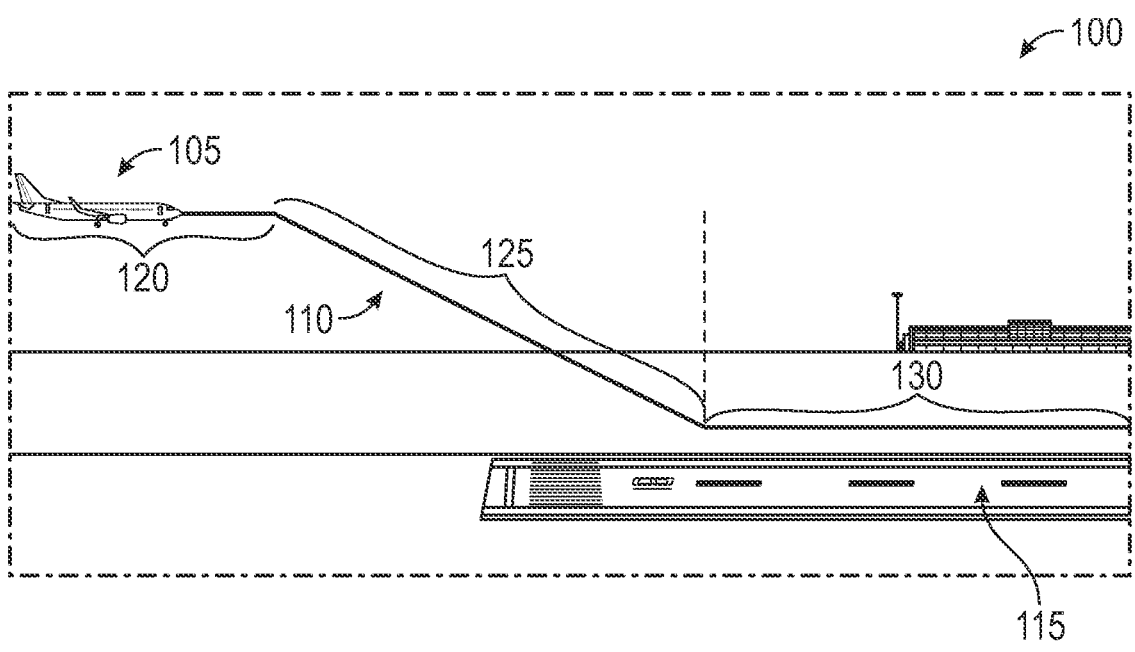
FIG. 1 depicts an exemplary approach and landing of an aircraft, according to one or more aspects.

The present disclosure provides techniques for identifying an unstable approach of an aircraft during flight, based on calculations of a specific energy of the aircraft during an approach segment of the flight. The specific energy is compared with an energy range defined relative to a reference specific energy, and an indicator of the comparison is communicated using one or more flight instruments. In some aspects, the specific energy is compared with limits of the energy range, which may include intermediate limits, and an audiovisual warning is presented when the specific energy exceeds one of the limits.

The techniques described herein can improve the situational awareness of the flight crew, and especially so during the approach segment, rapidly identifying conditions causing an unstable approach of the aircraft. In some aspects, the indicator may be implemented to further provide recommendations to the pilot as to changes in thrust application and/or attitude that will maintain and/or return the aircraft to a stabilized approach (and a balanced energy state). The improved situational awareness contributes to improved flight safety, and also reduces operational costs by mitigating the number of go-around events.

Conventional solutions that monitor (and alert) for unstable approach rely on sophisticated algorithms that evaluate several combinations of flight parameters and flight envelopes, but these solutions do not consider a total specific energy of the aircraft during the approach. Additionally, these conventional solutions require the adaptation or custom configuration of various avionics systems, which increases their cost. The techniques described herein provide a simple, cost-effective solution that may be implemented using standard avionics systems. For example, in some aspects the calculations of the specific energy are performed by the Flight Management System (FMS) using preexisting parameters, the indicator is displayed using a Primary Flight Display (PFD), and warning messages are visually displayed on PFDs and/or FMS (e.g., Multipurpose Control and Display Unit (MCDU)) scratchpads.

In the current disclosure, reference is made to various aspects. However, it should be understood that the present disclosure is not limited to specific described aspects. Instead, any combination of the following features and elements, whether related to different aspects or not, is contemplated to implement and practice the teachings provided herein. Additionally, when elements of the aspects are described in the form of "at least one of A and B," it will be understood that aspects including element A exclusively, including element B exclusively, and including element A and B are each contemplated. Furthermore, although some aspects may achieve advantages over other possible solutions and/or over the prior art, whether or not a particular advantage is achieved by a given aspect is not limiting of the present disclosure. Thus, the aspects, features, aspects and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Turn now to FIG. 1, which depicts an exemplary approach and landing of an aircraft 105, according to one or more aspects. In diagram 100, the aircraft 105 is operated along a predetermined flight path 110 until the aircraft 105 has landed on a runway 115. The flight path 110 includes a number of phases, including a cruise phase 120 where the aircraft 105 maintains a cruise altitude, a descent phase and an approach phase (shown here for simplicity as a single approach phase 125) where the aircraft 105 gradually reduces altitude, and a landing phase 130 where the aircraft 105 touches down on the runway 115. The various phases are not drawn to scale in the diagram 100.

One or more of the phases of the flight path 110 may define a plurality of segments. For example, the approach phase 125 may include an initial approach segment, an intermediate approach segment, a final approach segment, and a missed approach segment. The beginning and end of each of the phases (and each of the segments) are defined by particular operational criteria, which will be understood by the person of ordinary skill in the art.

In various aspects described herein, a specific energy of the aircraft 105 is calculated during the approach phase 125, and is used to identify whether the aircraft 105 is in an unstable approach. The specific energy is compared with an energy range defined relative to a reference specific energy, and an indicator of the comparison is communicated using one or more flight instruments. Through communicating the indicator, the situational awareness of the flight crew is improved during the approach phase 125.

Figure 2:
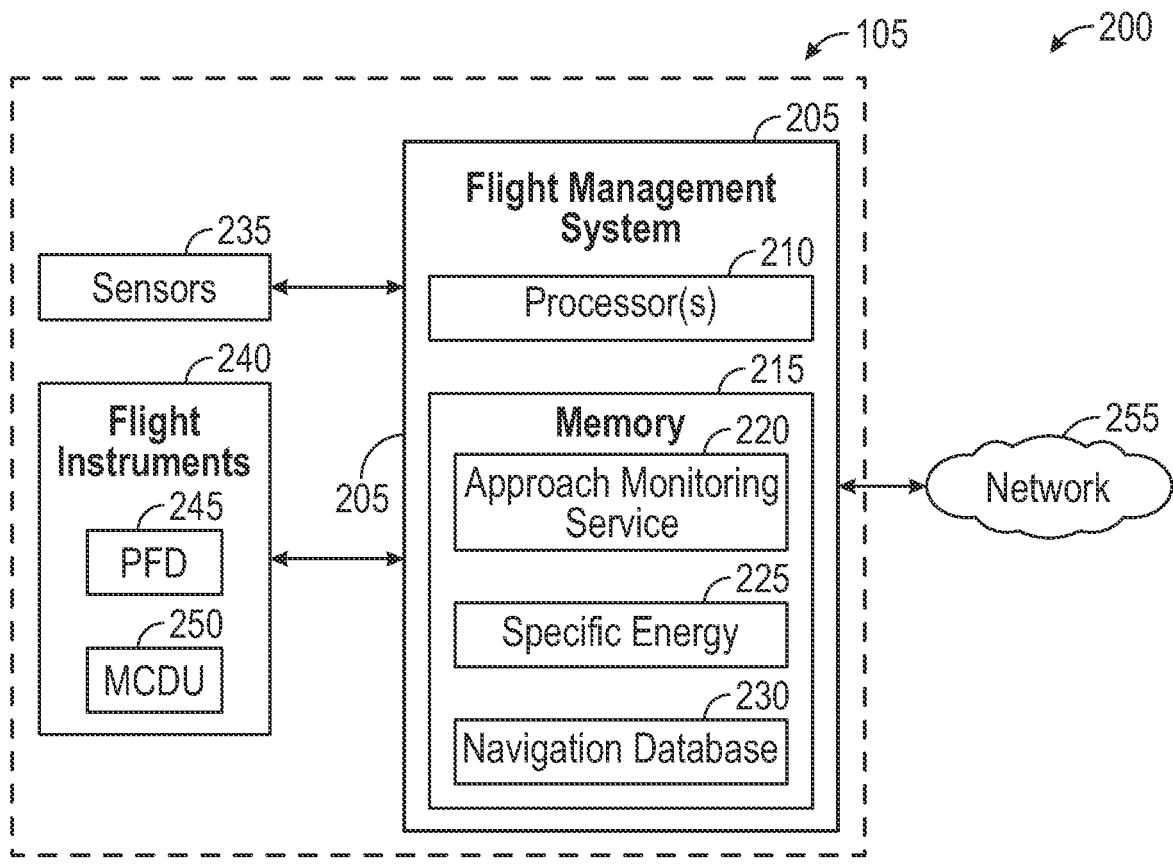
FIG. 2 is a block diagram of an example system capable of identifying an unstable approach of an aircraft, according to one or more aspects.

FIG. 2 is a block diagram of an example system 200 capable of identifying an unstable approach of an aircraft, according to one or more aspects. The features of the system 200 may be used in conjunction with other aspects.

In the system 200, the aircraft 105 comprises a FMS 205, a plurality of sensors 235, and a plurality of flight instruments 240. The FMS 205 is an electronic device, disposed onboard the aircraft 105, that provides navigation, performance, and operations functionalities for the aircraft 105. As used herein, an "electronic device" generally refers to any device having electronic circuitry that provides a processing or computing capability, and that implements logic and/or executes program code to perform various operations that collectively define the functionality of the electronic device. The functionality of the electronic device includes a communicative capability with one or more other electronic devices, e.g., when connected to a same network. An electronic device may be implemented with any suitable form factor, whether relatively static in nature (e.g., mainframe, computer terminal, server, kiosk, workstation) or mobile (e.g., laptop computer, tablet, handheld, smart phone, wearable device). The communicative capability between electronic devices may be achieved using any suitable techniques, such as conductive cabling, wireless transmission, optical transmission, and so forth.

As shown, the FMS 205 is coupled with the plurality of sensors 235 and with the plurality of flight instruments 240. In other aspects, one or more of the flight instruments 240 are integrated into the FMS 205. The FMS 205 may be coupled with one or more electronic devices that are external to the aircraft 105 through a network 255 (e.g., one or more local area networks (LANs) and/or a wide area network (WAN)).

Although described as being performed by a single electronic device, in other aspects, the functionalities of the FMS 205 may be performed by a plurality of electronic devices. In one non-limiting example, the FMS 205 comprises a Flight Management Computer (FMC) that allows the flight path to be pre-programmed; an Automatic Flight Control System (AFCS) or Automatic Flight Guidance System (AFGS) that receives information from one or more of the sensors 235 and provides signals for control surfaces of the aircraft 105 and/or recommendations to the pilot; an Aircraft Navigation System that calculates positioning of the aircraft 105 using an inertial reference system, Global Positioning System (GPS), and/or ground-based aids; and an Electronic Flight Instrument System (EFIS) or electromechanical instruments.

The FMS 205 comprises one or more processors 210 and a memory 215. The one or more processors 210 are any electronic circuitry, including, but not limited to one or a combination of microprocessors, microcontrollers, application-specific integrated circuits (ASIC), application-specific instruction set processors (ASIP), and/or state machines, that is communicatively coupled to the memory 215 and controls the operation of the FMS 205. The one or more processors 210 are not limited to a single processing device and may encompass multiple processing devices.

The one or more processors 210 may include other hardware that operates software to control and process information. In some aspects, the one or more processors 210 execute software stored in the memory 215 to perform any of the functions described herein. The one or more processors 210 control the operation and administration of the FMS 205 by processing information (e.g., information received from input devices and/or communicatively coupled electronic devices).

The memory 215 may store, either permanently or temporarily, data, operational software, or other information for the one or more processors 210. The memory 215 may include any one or a combination of volatile or non-volatile local or remote devices suitable for storing information. For example, the memory 215 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory 215, a disk, a CD, or a flash drive. In particular embodiments, the software may include an application executable by the one or more processors 210 to perform one or more of the functions described herein.

In this example, the memory 215 stores an approach monitoring service 220 that acquires measurements from the plurality of sensors 235 (or values of one or more parameters derived from the measurements), and determines a specific energy 225 of the aircraft 105 during the approach phase 125 of the flight. The types of the plurality of sensors 235 used in the aircraft 105 will be known to the person of ordinary skill in the art. In some aspects, the approach monitoring service 220 calculates the actual total specific energy of the aircraft 105 throughout the approach phase 125 (e.g., at any ground position between the point at which the initial approach flap (also referred to herein as a landing flap) setting is selected, and 50 feet above the threshold of the runway 115). In some aspects, the approach monitoring service 220 compares the specific energy with an energy range, and generates a signal to cause an indicator of the specific energy, relative to the energy range, to be visually displayed using a flight instrument of the aircraft 105. The energy range is defined relative to a reference specific energy of the aircraft 105, which in some aspects is also calculated by the approach monitoring service 220. Further discussion of calculation of the energy range is provided below with respect to FIGS. 4 and 5.

The indicator is displayed using one of the plurality of flight instruments 240. As shown, the flight instruments 240 comprise a PFD 245 and an MCDU 250, although other numbers and types of flight instruments 240 are also contemplated. The flight instruments 240 used in the aircraft 105 will be known to the person of ordinary skill in the art. In some aspects, the indicator is displayed using a PFD 245 of the aircraft 105. In some alternate aspects, the indicator may be displayed using another display of the aircraft 105, such as a multi-function display (MFD). Generally, the PFD 245 comprises an electronic display implementing any suitable display technology (e.g., CRT, (O)LED, LCD). The PFD 245 displays various flight information, such as an airspeed indicator, a turn coordinator, an attitude indicator, a heading indicator, an altimeter, and a vertical speed indicator. Although the PFD 245 may display the flight information in any suitable manner, in some aspects, the PFD 245 displays representations of mechanical flight instruments (e.g., a cluster of analog gauges). In one example implementation, the indicator of the specific energy comprises a graphical element overlaid on a vertical flight director (F/D) bar of the PFD 245. Further discussion of displaying the indicator using the PFD 245 is provided below with respect to FIG. 6.

In some aspects, the approach monitoring service 220 compares the specific energy with one or more limits of the energy range, and generates signals to cause a flight instrument 240 of the aircraft 105 to present audiovisual warning(s) responsive to the specific energy of the aircraft exceeding the limit(s). In one example implementation, the audiovisual warning(s) comprise textual warnings that are displayed on a scratchpad of a flight instrument 240, such as the PFD 245 or the MCDU 250. Further discussion of presenting the audiovisual warning(s) is provided below with respect to FIG. 7.

In some aspects, the memory 215 further stores a navigation database 230 containing information that is used to construct a flight plan for the aircraft 105. For example, the navigation database 230 may include some or all of the following information: waypoints/intersections, airways, radio navigation aids, airports, runways, and/or standard procedures (SID, STAR, IAP, holds). The information may be stored in the navigation database 230 with any suitable formatting.

In some alternate aspects, the approach monitoring service 220 may be implemented using one or more electronic devices other than the FMS 205, for example, an electronic device that is wirelessly coupled with the FMS 205 through the network 255. Such an electronic device may be located onboard the aircraft 105 (e.g., another electronic device of the aircraft 105, a portable electronic device) or external to the aircraft 105.

Figure 3:
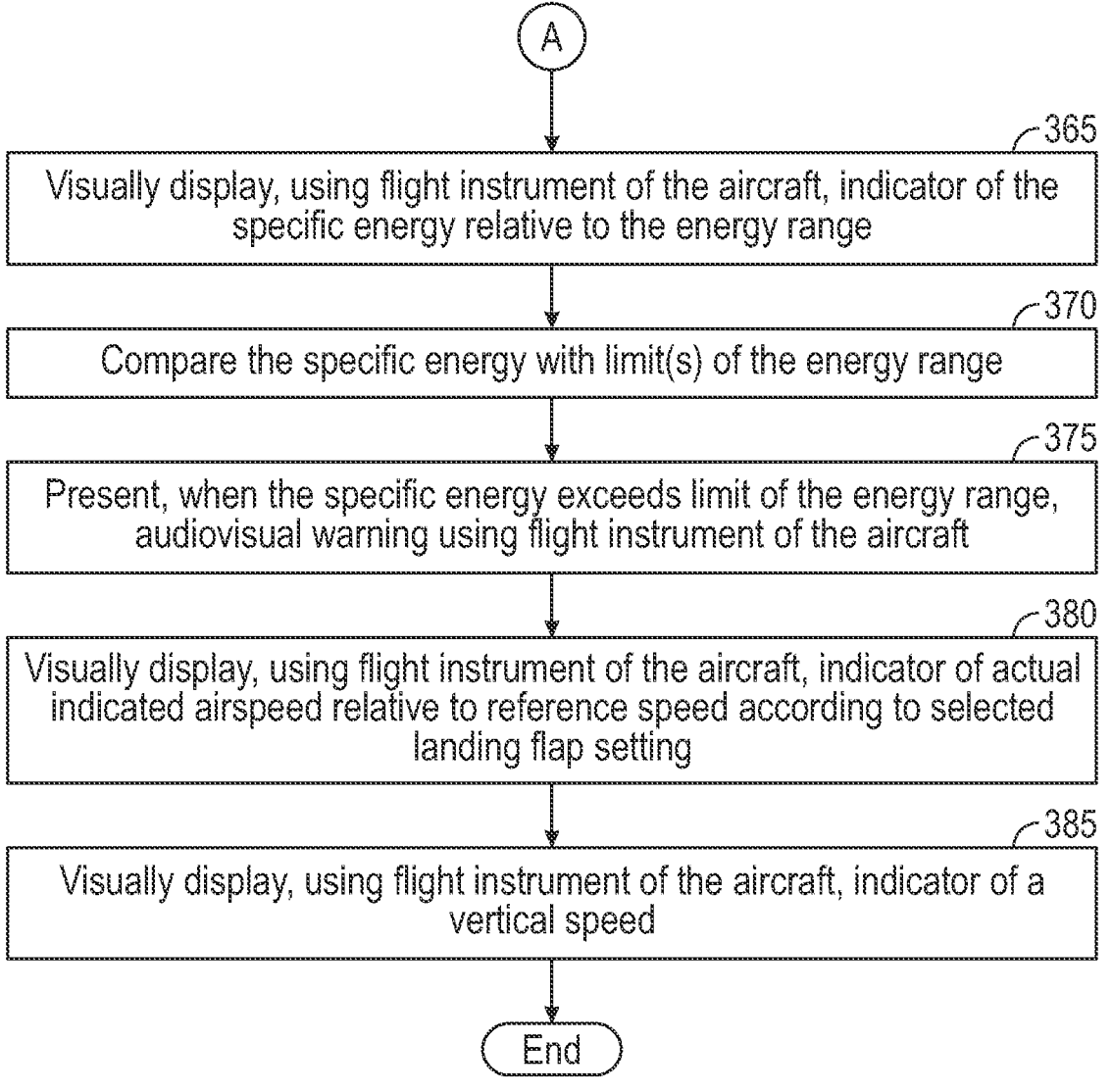
FIG. 3 is a method of identifying an unstable approach of an aircraft, according to one or more aspects.

FIG. 3 is a method 300 of identifying an unstable approach of an aircraft, according to one or more aspects. The method 300 may be used in conjunction with other aspects. For example, in some aspects the method 300 may be performed by the approach monitoring service 220 and/or other components of the FMS 205. In some aspects, the method 300 may be performed, partly or fully, by electronic device(s) that are separate from the FMS 205.

The method 300 begins at block 305, where the FMS 205 acquires measurements during flight. In some aspects, the measurements include positional information for the aircraft 105, such as samples of a GPS signal, an Inertial Navigation System signal, a radio navigation signal, and so forth. Other measurements are also contemplated.

At block 310, the FMS 205 determines, using values of a ground speed and a height of the aircraft 105, a specific energy of the aircraft 105 during an approach phase 125 of the flight. In some aspects, the specific energy of the aircraft 105 is determined according to Equation (1):

$$e\_actual = \frac{GS^2}{2} + g \cdot H \qquad (1)$$

where GS represents the actual ground speed of the aircraft 105, H represents the actual height of the aircraft 105 above a threshold elevation, and g represents the gravitational acceleration constant. In some aspects, GS is computed by the FMS 205 or by an Air Data Inertial Reference System (ADIRS) coupled with the FMS 205. In some aspects, H is computed by the FMS 205.

In some aspects, the FMS 205 determines values of the specific energy at points of the flight path 110, beginning from where the approach flap is first deployed and ending at 50 feet above the threshold of the runway 115 (i.e., above ground level (AGL)). The FMS 205 may determine the values of the specific energy with any suitable sampling period, such as one (1) second.

At block 315, the FMS 205 determines a reference specific energy of the aircraft 105. In some aspects, determining the reference specific energy of the aircraft 105 comprises determining a reference ground speed term (block 320) and determining a reference height term (block 325), and the reference specific energy comprises a sum of the reference ground speed term and the reference height term. In some aspects, the reference specific energy is determined according to Equation (2):

$$e\_ref = \frac{GSref^2}{2} + g \cdot Href \qquad (2)$$

where $$\frac{GSref^2}{2}$$

represents the reference ground speed term and g. Href represents the reference height term.

In some aspects, the reference ground speed term $$\frac{GSref^2}{2}$$

comprises a reference speed that is determined according to a selected landing flap setting. In some aspects, the reference ground speed term comprises a sum of the reference speed, a headwind term, and a speed adjustment term. For example, when landing flaps are deployed, the reference ground speed term is determined according to Equation (3):

$$GSref = VREF + \Delta V + HW \tag{3}$$

and when approach flaps are deployed, the reference ground speed term is determined according to Equation (4):

$$GSref = VREF40 + X + HW \tag{4}$$

where VREF represents the reference speed according to the selected landing flap setting, as determined by the FMS 205, $\Delta V$ represents the speed adjustment term input to the FMS 205 by the pilot for the approach (e.g., with a minimum value of 5 kt), and HW represents the headwind term computed by the FMS 205 based on pilot input (e.g., reported by air traffic control). VREF40 represents the reference speed for a 40° flap setting, and X represents a pilot-selectable speed adjustment term (e.g., default five (5) kt). Thus, for a zero wind condition the minimum selectable speed would be (VREF+5 kt).

In some aspects, the reference height term g. Href is based in part on data retrieved from the navigation database 230 of the FMS 205. In some aspects, Href is a reference height above the threshold elevation, and is determined according to Equations (5) and (6):

$$Href = D \cdot \tan(GPA) - \text{Elev\_thr} \tag{5}$$

when the distance D to the threshold is between a final approach fix (FAF) and a point that is a predetermined height value (e.g., 50 feet) above the threshold, and $$Href = D \cdot \tan(\text{Path\_angle}) + ALT_{FAF} - \text{Elev\_thr} \tag{6}$$

when the distance D to the threshold is between a predetermined distance value (e.g., 15 nautical miles) and the FAF. Different values of the predetermined height value and the predetermined distance values are also contemplated.

Thus, according to Equation (5), the FMS 205 determines the reference height Href as a product of the distance D and a tangent of a final approach path angle GPA, minus the threshold elevation Elev_thr. According to Equation (6), the FMS 205 determines the reference height Href as a product of the distance D and a tangent of an approach segment path angle Path_angle, plus an altitude of the FAF ALT$_{FAF}$, minus the threshold elevation Elev_thr. In some aspects, the FMS 205 computes the distance D and the approach segment path angle Path_angle, and acquires the final approach path angle GPA and the landing threshold elevation Elev_thr from the navigation database 230.

At block 330, the FMS 205 defines an energy range relative to the reference specific energy. In some aspects, defining the energy range comprises receiving one or more user inputs for a first gain value Kmin and a second gain value Kmax (block 335). For example, the first gain value Kmin and the second gain value Kmax may be configurable in the FMS 205 via a dedicated page (e.g., an extension of a Performance Factors page).

At block 340, the FMS 205 determines whether the first gain value Kmin and the second gain value Kmax are within a permissible range that is based on a margin value. In some aspects, the permissible range is defined according to Equations (7) and (8):

$$1 - \text{Margin} < Kmin < 0.99 \tag{7}$$

$$1.01 < Kmax < 1 + \text{Margin} \tag{8}$$

In some aspects, a default value of the margin is 0.2. However, other margin values and other parameters of the permissible range are also contemplated.

Assuming that the first gain value Kmin and the second gain value Kmax are within the permissible range, the method 300 proceeds to block 345, where the FMS 205 determines a minimum limit of the energy range as a product of the first gain value Kmin and the reference specific energy e_ref, as represented in Equation (9):

$$e\_min = Kmin * e\_ref \tag{9}$$

At block 350, the FMS 205 determines a maximum limit of the energy range as a product of a second gain value Kmax and the reference specific energy e_ref, as represented in Equation (10):

$$e\_max = Kmax * e\_ref \tag{10}$$

Figure 4:
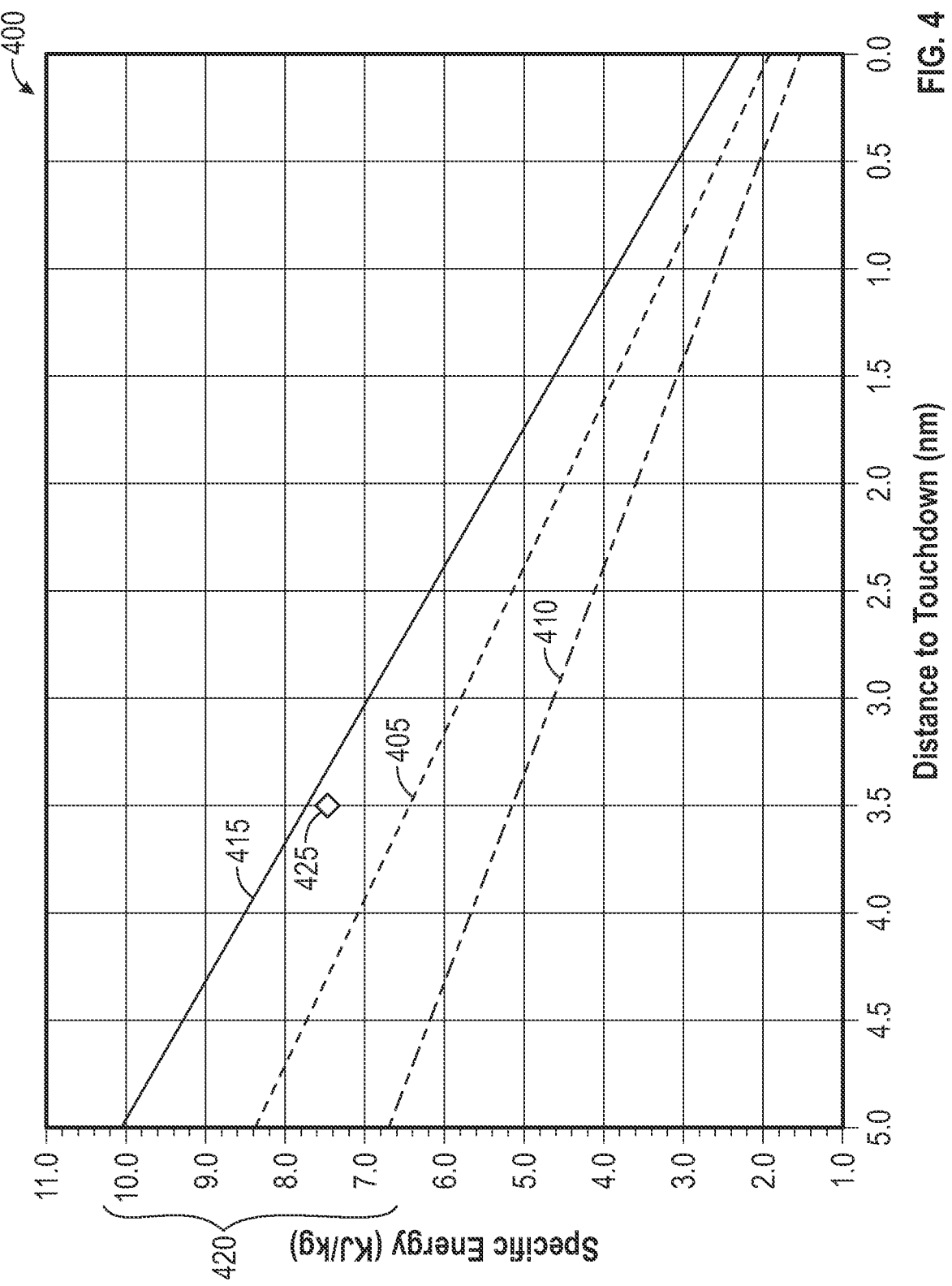
FIG. 4 depicts an exemplary energy range defined relative to a reference specific energy, according to one or more aspects.

Turn now to FIG. 4, which depicts an exemplary energy range 420 defined relative to the reference specific energy e_ref, according to one or more aspects. In graph 400, plot 405 represents the reference specific energy e_ref for the approach phase. Plot 410 represents the minimum limit e_min, and plot 415 represents the maximum limit e_max. Each of the plots 405, 410, 415 decreases proportionally with a decrease in the distance to touchdown of the aircraft 105. For example, the reference ground speed term GSref of the aircraft 105 is decreased as the aircraft 105 nears the runway (i.e., as the distance to touchdown decreases). As shown in Equations (2), (9), and (10), the reference specific energy e_ref, the minimum limit e_min, and the maximum limit e_max each decrease according to the square of the decrease in the reference ground speed term GSref.

The point 425 represents a single measurement of a specific energy e_actual of the aircraft 105, e.g., as calculated by the FMS 205. The point 425 falls within the energy range 420, indicating that the specific energy of the aircraft 105 is not causing an unstable approach. As will be discussed in greater detail below, in some aspects no audiovisual warning (or other alert) will be generated by the FMS 205 for this condition.

In some aspects, one or more intermediate limits may be defined in the energy range 420 between the minimum limit and the maximum limit. Such intermediate limit(s) may be used to trigger different alerts and/or warnings to improve the situational awareness of the pilot. Returning to FIG. 3, at block 355 the FMS 205 determines a first intermediate limit between the reference specific energy and the minimum limit, and at block 360 the FMS 205 determines a second intermediate limit between the reference specific energy and the maximum limit.

Figure 5:
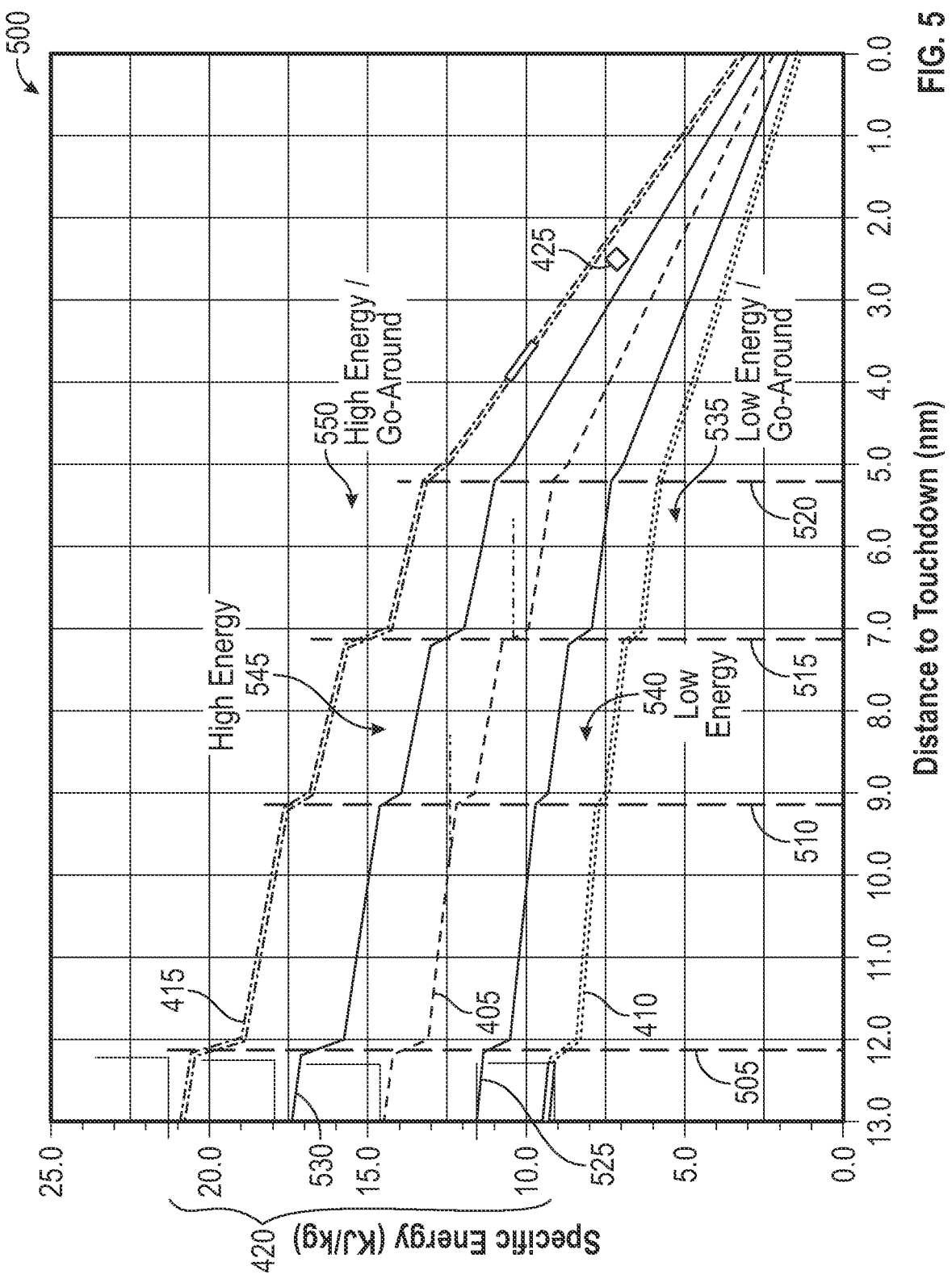
FIG. 5 depicts an exemplary energy range having intermediate limits and a reference specific energy based on landing flap settings, according to one or more aspects.

FIG. 5 depicts an exemplary energy range having intermediate limits and a reference specific energy based on landing flap settings, according to one or more aspects. In graph 500, the plot 405 again represents the reference specific energy e_ref for the approach phase. However, instead of a single, linear plot as in the graph 400, the plot 405 includes a plurality of segments corresponding to a plurality of landing flap settings 505, 510, 515, 520 according to a flap extension schedule for the approach phase. In one non-limiting example, the landing flap setting 505 is "Flap 1", the landing flap setting 510 is "Flap 5", the landing flap setting 515 is "Flap 15", and the landing flap setting 520 is "Flap 40", although other values and sequences of landing flap settings are also contemplated. As shown, the plot 405 includes relatively steep segments where the landing flaps transition from one setting to the next, and flatter segments between the transitions.

The plots 410, 415 define the minimum limit and the maximum limit of the energy range 420. Like the plot 405, the plots 410, 415 each include different segments that correspond to the landing flap settings 505, 510, 515, 520. The graph 500 further includes a plot 525 representing a first intermediate limit between the reference specific energy (the plot 405) and the minimum limit (the plot 410), and a plot 530 representing a second intermediate limit between the reference specific energy (the plot 405) and the maximum limit (the plot 415). The plots 525, 530 each include different segments that correspond to the landing flap settings 505, 510, 515, 520. The first intermediate limit and the second intermediate limit may have any suitable values, which may correspond to particular values of the specific energy or relative to the reference specific energy, the minimum limit, and/or the maximum limit (e.g., the midpoint between the reference specific energy and the maximum limit).

As mentioned above, the intermediate limits represented by the plots 525, 530 may be used to provide alerts and/or warnings with greater resolution to the pilot of the aircraft 105. For values of a specific energy of the aircraft 105 falling between the plots 525, 530, the specific energy of the aircraft 105 is not causing (nor particularly likely to cause) an unstable approach. In some aspects, no audiovisual warning (or other alert) will be generated by the FMS 205 for this condition.

In some aspects, for values of the specific energy between the minimum limit (the plot 410) and the first intermediate limit (the plot 525), the FMS 205 generates a first audiovisual warning 540 ("LOW ENERGY"). In some aspects, for values of the specific energy less than the minimum limit, the FMS 205 generates a second audiovisual warning 535 ("LOW ENERGY/GO-AROUND") directing the pilot to perform a go-around.

In some aspects, for values of the specific energy between the second intermediate limit (the plot 530) and the maximum limit (the plot 415), the FMS 205 generates a third audiovisual warning 545 ("HIGH ENERGY"). As shown, the point 425 falls between the second intermediate limit and the maximum limit. In some aspects, for values of the specific energy greater than the maximum limit, the FMS 205 generates a fourth audiovisual warning 550 ("HIGH ENERGY/GO-AROUND") directing the pilot to perform a go-around.

The text of the various audiovisual warnings 535, 540, 545, 550 has been provided as one non-limiting example. Other texts, visual elements, and/or audio elements are also contemplated. Further, although a first intermediate limit and a second intermediate limit are described, other aspects may include different numbers of intermediate limits that provide a different level of granularity to the pilot.

Although described in terms of the FMS 205 defining the energy range 420, in some aspects, features of the energy range 420 may be displayed in the aircraft 105 (e.g., in a Vertical Situation Display (VSD)) to improve the situational awareness of the pilot.

Returning to FIG. 3, at block 365 the FMS 205 visually displays, using a flight instrument 240 of the aircraft 105, an indicator of the specific energy relative to the energy range. In some aspects, the FMS 205 generates a signal causing the indicator to be visually displayed. In some aspects, the flight instrument 240 comprises a PFD 245 of the aircraft 105.

Figure 6:
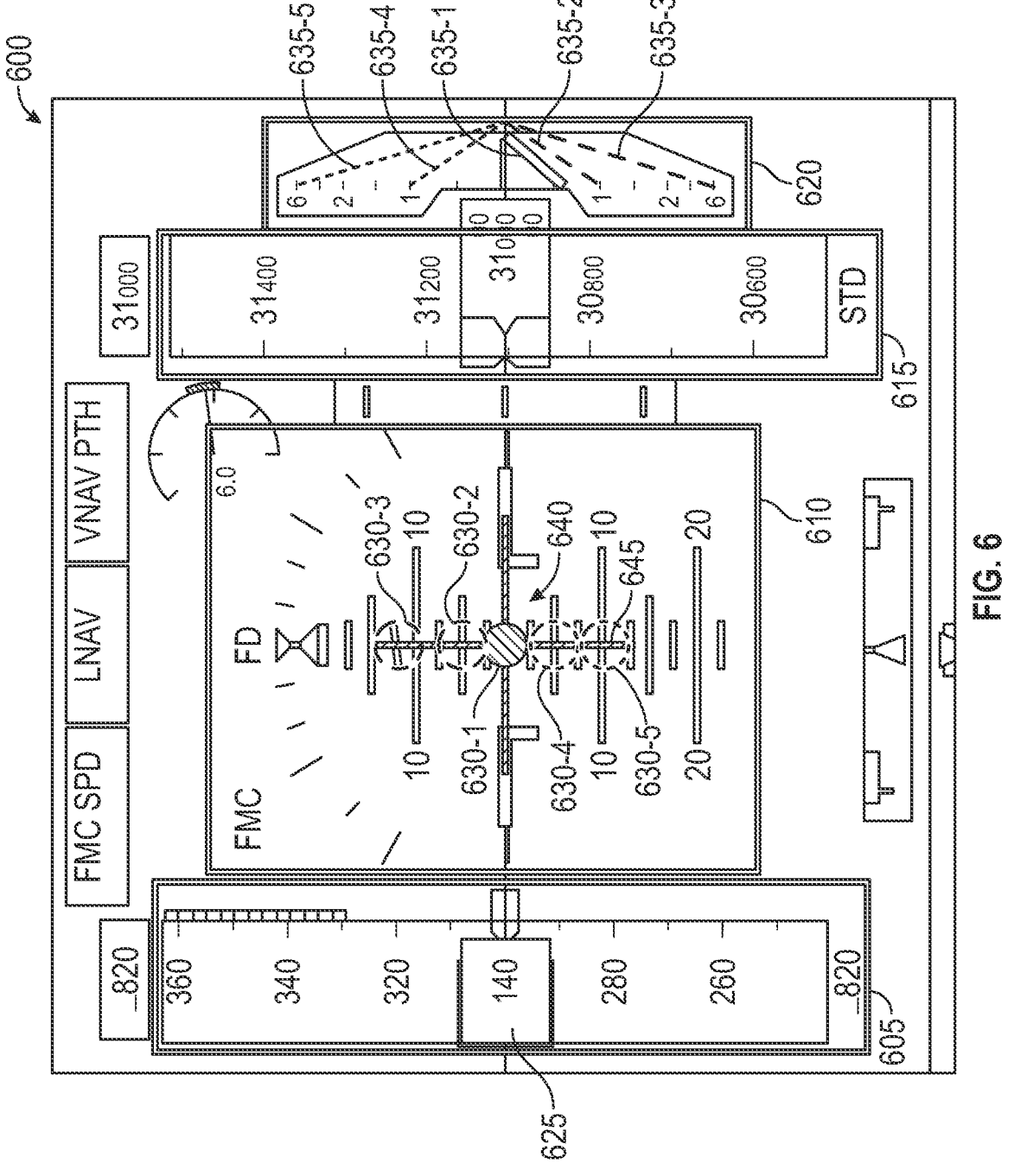
FIG. 6 depicts an exemplary Primary Flight Display (PFD) with an indicator of a specific energy relative to the energy range, according to one or more aspects.

FIG. 6 depicts an exemplary PFD 245 with the indicator, according to one or more aspects. In diagram 600, the PFD 245 displays (from left to right) an airspeed indicator 605, an attitude indicator 610, an altimeter 615, and a vertical speed indicator 620. A flight director (FD) 640 comprising a dual crossbar is overlaid on the attitude indicator 610. An indicator 630-1 of the specific energy relative to the energy range comprises a graphical element overlaid on a vertical crossbar 645 of the FD 640.

As shown, the indicator 630-1 is a green circle overlaid on the center of the vertical crossbar 645. In some aspects, one or more properties of the indicator 630-1, such as the position, color, shape, and size of the indicator 630-1, are controlled based on the specific energy.

In some aspects, the specific energy controls one or both of a position and a color of the indicator 630-1. In some aspects, the range of the indicator 630-1 along the vertical crossbar 645 is determined according to Equation (11):

$$L = K \cdot \frac{e_{actual} - e\_ref}{e\_ref} \qquad (11)$$

where K represents a scale factor to fit the range onto a length of vertical crossbar 645.

In some aspects, where the specific energy is between the first intermediate limit and the second intermediate limit, the indicator 630-1 is green (or white) and positioned on the center of the vertical crossbar 645. Where the specific energy is between the second intermediate limit and the maximum limit, the indicator is amber and positioned above the center of the vertical crossbar 645 (shown as outline 630-2). Where the specific energy exceeds the maximum limit, the indicator is red and positioned at the top of the vertical crossbar 645 (shown as outline 630-3).

Continuing the example, where the specific energy is between the first intermediate limit and the minimum limit, the indicator is amber and positioned below the center of the vertical crossbar 645 (shown as outline 630-4). Where the specific energy exceeds the minimum limit, the indicator is red and positioned at the bottom of the vertical crossbar 645 (shown as outline 630-5).

At block 370, the FMS 205 compares the specific energy with one or more limits of the energy range. In some aspects, the one or more limits include the minimum limit, the maximum limit, the first intermediate limit, and the second intermediate limit.

At block 375, the FMS 205 presents, when the specific energy exceeds a limit of the energy range, an audiovisual warning using a flight instrument 240 of the aircraft 105. As used herein, an "audiovisual warning" may be presented audibly, visually, or both. In some aspects, the audiovisual warning is a textual warning displayed on a scratchpad of the FMS 205 or the MCDU 250.

In some aspects, the audiovisual warning may further include an audible warning corresponding to the textual warning. The audible warning may be presented each time the infringing condition is met. In some aspects, the audible warning may be latched on defined intervals, e.g., depending on radio altitudes. For example, between the FAF altitude and 1000 ft AGL, the audible warning may be triggered every five (5) seconds. Between 1000 ft and 500 ft AGL, the audible warning may be triggered every three (3) seconds, indicating a greater urgency. In some aspects, the audible warnings may be inhibited by the operator below a certain radio altitude (e.g., 500 ft AGL).

Where the specific energy exceeds the second intermediate limit (but is less than the maximum limit), the FMS 205 generates the third audiovisual warning 545 ("HIGH ENERGY"). Where the specific energy exceeds the maximum limit, the FMS 205 generates the fourth audiovisual warning 550 ("HIGH ENERGY/GO-AROUND"). Where the specific energy exceeds the first intermediate limit (but is greater than the minimum limit), the FMS 205 generates the first audiovisual warning 540 ("LOW ENERGY"). Where the specific energy exceeds the minimum limit, the FMS 205 generates the second audiovisual warning 535 ("LOW ENERGY/GO-AROUND").

Figure 7:
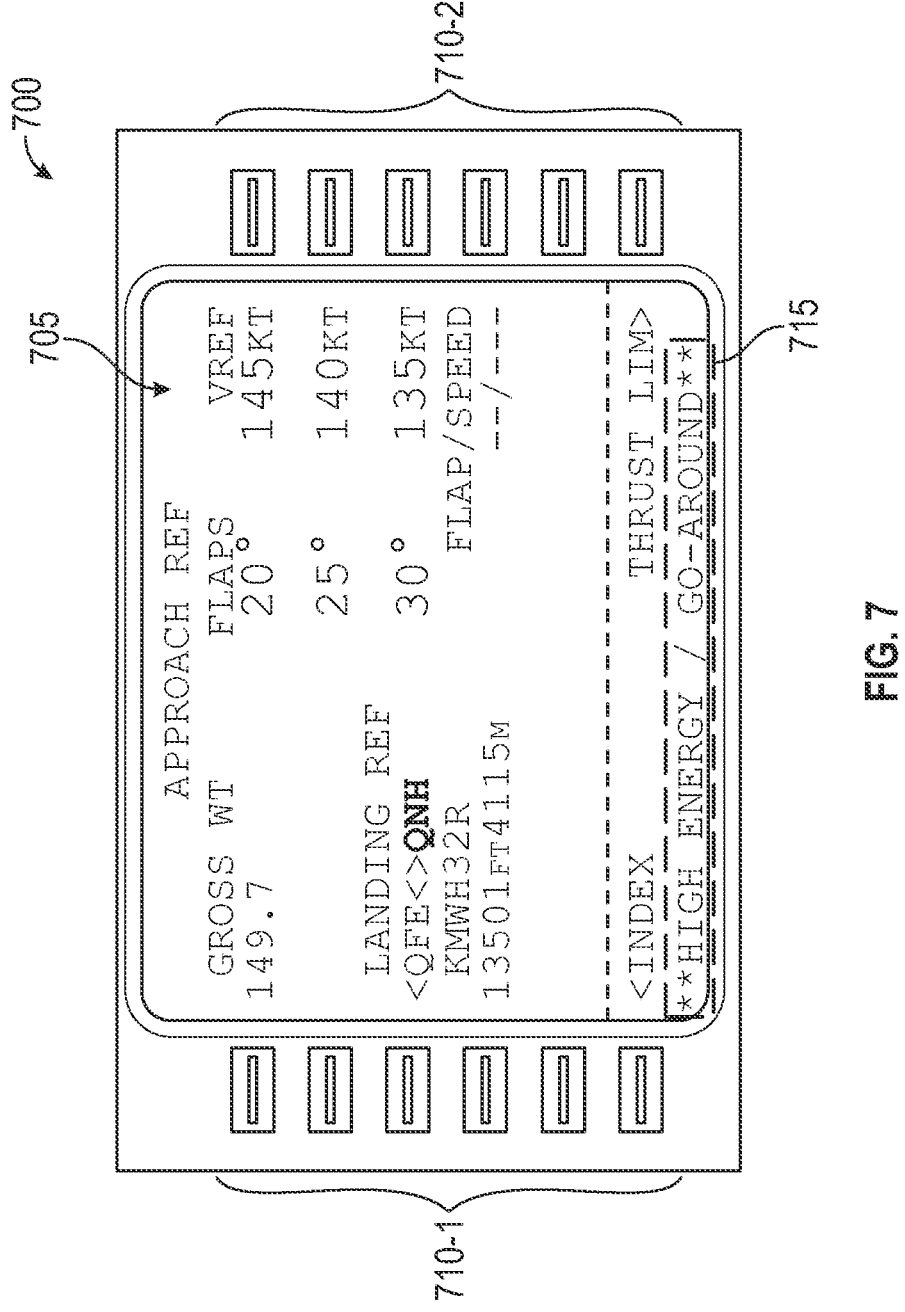
FIG. 7 depicts an exemplary Multipurpose Control and Display Unit (MCDU) with a textual warning displayed on a scratchpad, according to one or more aspects.

FIG. 7 depicts an exemplary MCDU 250 with a textual warning displayed on a scratchpad, according to one or more aspects. In diagram 700, the MCDU 250 comprises a display area 705 arranged between a first row of virtual buttons 710-1 and a second row of virtual buttons 710-2. The scratchpad is displayed on the display area 705, and the third audiovisual warning 545 is depicted at location 715 of the scratchpad.

At block 380, the FMS 205 visually displays, using a flight instrument 240 of the aircraft 105, an indicator of actual indicated airspeed relative to reference speed according to selected landing flap setting. In some aspects, the flight instrument 240 comprises the PFD 245, and the indicator of the actual indicated airspeed comprises an airspeed readout 625 of the airspeed indicator 605 of the PFD. In some aspects, a color of the airspeed readout 625 is based on the actual indicated airspeed.

In some aspects, where the actual indicated airspeed is between Vref and Vref+5 knots indicated airspeed (KIAS), the color of the airspeed readout 625 is white (or green). Where the actual indicated airspeed is between Vref+5 and Vref+X KIAS, or is between Vref and Vref−X KIAS, the color of the airspeed readout 625 is amber. Where the actual indicated airspeed is greater than Vref+X KIAS, or less than Vref−X KIAS, the color of the airspeed readout 625 is red. Here, X represents an operator-defined limit for stable approach criteria (e.g., loaded by the operator into the FMS Configuration DB).

At block 385, the FMS 205 visually displays, using a flight instrument 240 of the aircraft 105, an indicator of a vertical speed. In some aspects, the flight instrument 240 comprises the PFD 245, and the indicator of the vertical speed comprises one or both of a vertical speed readout and a vertical speed pointer 635-1 of the vertical speed indicator 620. The color of the indicator is based on the vertical speed.

In some aspects, where the vertical speed is between first and second threshold values (e.g., ±500 FT/Min), the vertical speed pointer 635-1 and/or the vertical speed readout are white (or green). Where the vertical speed is between the first threshold value (e.g., +500 FT/Min) and a third threshold value (e.g., +1000 FT/Min) (as shown by outline 635-4), or between the second threshold value (e.g., −500 FT/Min) and a fourth threshold value (e.g., −1000 FT/Min) (as shown by outline 635-2), the vertical speed pointer 635-1 and/or the vertical speed readout are amber. Where the vertical speed is greater than the third threshold value (e.g., +1000 FT/Min) (as shown by outline 635-5), or less than the fourth threshold value (e.g., −1000 FT/Min) (as shown by outline 635-3), the vertical speed pointer 635-1 and/or the vertical speed readout are red. The method 300 ends following completion of block 385.

As will be appreciated by one skilled in the art, aspects described herein may be embodied as a system, method or computer program product. Accordingly, aspects may take the form of an entirely hardware aspect, an entirely software aspect (including firmware, resident software, micro-code, etc.) or an aspect combining software and hardware aspects that may all generally be referred to herein as a "circuit," "module" or "system." Furthermore, aspects described herein may take the form of a computer program product embodied in one or more computer readable storage medium(s) having computer readable program code embodied thereon.

Program code embodied on a computer readable storage medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to aspects of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various aspects of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

While the foregoing is directed to aspects of the present disclosure, other and further aspects of the disclosure may be devised without departing from the basic scope thereof, and the scope thereof is determined by the claims that follow.

What is claimed is:

1. A method of monitoring for an unstable approach of an aircraft during flight, the method comprising:

determining, using values of a ground speed and a height of the aircraft derived from measurements acquired during the flight, a specific energy of the aircraft during an approach phase of the flight;

determining a reference specific energy of the aircraft;

defining an energy range relative to the reference specific energy; and visually displaying, using a first flight instrument of the aircraft, an indicator of the specific energy relative to the energy range.

2. The method of claim 1, wherein the first flight instrument comprises a primary flight display (PFD), wherein the indicator of the specific energy comprises a graphical element overlaid on a vertical crossbar of a flight director (FD) of the PFD, and wherein one or both of a position and a color of the graphical element is based on the specific energy.

3. The method of claim 1, further comprising:

visually displaying, using a second flight instrument of the aircraft, an indicator of an actual indicated airspeed relative to a reference speed according to a selected landing flap setting.

4. The method of claim 3, wherein the second flight instrument comprises a primary flight display (PFD), wherein the indicator of the actual indicated airspeed comprises an airspeed readout of an airspeed indicator of the PFD, and wherein a color of the airspeed readout is based on the actual indicated airspeed.

5. The method of claim 1, further comprising:

visually displaying, using a third flight instrument of the aircraft, an indicator of a vertical speed.

6. The method of claim 5, wherein the third flight instrument comprises a primary flight display (PFD), wherein the indicator of the vertical speed comprises one or both of a vertical speed readout and a vertical speed pointer of a vertical speed indicator of the PFD, and wherein a color of the indicator is based on the vertical speed.

7. The method of claim 1, further comprising:

comparing the specific energy with one or more limits of the energy range; and presenting, when the specific energy exceeds a limit of the energy range, an audiovisual warning using a fourth flight instrument of the aircraft.

8. The method of claim 7, wherein the audiovisual warning comprises a textual warning displayed on a scratchpad of the fourth flight instrument.

9. The method of claim 1, wherein the reference specific energy is a sum of a reference ground speed term, and a reference height term based on a threshold elevation.

10. A method of identifying an unstable approach of an aircraft, performed using a flight management system (FMS) of the aircraft, the method comprising:

determining a reference specific energy of the aircraft, wherein determining the reference specific energy of the aircraft comprises:

determining a reference ground speed term comprising a reference speed according to a selected landing flap setting; and determining a reference height term based in part on data retrieved from a navigation database of the FMS;

defining an energy range relative to the reference specific energy;

determining, using an actual height and an actual ground speed of the aircraft, a specific energy of the aircraft during an approach phase of a flight; and generating a signal to cause an indicator of the specific energy of the aircraft, relative to the energy range, to be visually displayed using a flight instrument of the aircraft.

11. The method of claim 10, wherein the reference specific energy comprises a sum of the reference ground speed term and the reference height term.

12. The method of claim 11, wherein the reference ground speed term comprises a sum of a reference speed according to a selected landing flap setting, a headwind term, and a speed adjustment term.

13. The method of claim 11, wherein the reference height term comprises one of the following:

when a distance of the aircraft to a runway threshold is between a predetermined distance value and a final approach fix (FAF), a product of the distance and a tangent of an approach phase path angle, plus an altitude of the FAF, minus a threshold elevation, and when the distance is between the FAF and a point that is a predetermined height value above the runway threshold, a product of the distance and a tangent of a final approach path angle, minus the threshold elevation.

14. The method of claim 10, wherein defining the energy range comprises:

determining a minimum limit as a product of a first gain value and the reference specific energy; and determining a maximum limit as a product of a second gain value and the reference specific energy.

15. The method of claim 14, wherein defining the energy range further comprises:

receiving one or more user inputs for the first gain value and the second gain value; and determining whether the first gain value and the second gain value are within a permissible range that is based on a margin value.

16. The method of claim 14, wherein defining the energy range further comprises:

determining a first intermediate limit between the reference specific energy and the minimum limit; and determining a second intermediate limit between the reference specific energy and the maximum limit, and wherein the method further comprises:

generating a first signal to cause a flight instrument of the aircraft to present a first audiovisual warning responsive to the specific energy of the aircraft exceeding the first intermediate limit or the second intermediate limit; and generating a second signal to cause the flight instrument to present a second audiovisual warning responsive to the specific energy of the aircraft exceeding the minimum limit or the maximum limit.

17. A system comprising:

one or more computer processors; and a memory storing instructions that when executed by the one or more computer processors enable performance of an operation of identifying an unstable approach of an aircraft, the operation comprising:

determining a reference specific energy of the aircraft, wherein determining the reference specific energy of the aircraft comprises:

determining a reference ground speed term comprising a reference speed according to a selected landing flap setting; and determining a reference height term based in part on data retrieved from a navigation database;

defining an energy range relative to the reference specific energy;

determining, using an actual height and an actual ground speed of the aircraft, a specific energy of the aircraft during an approach phase; and generating a signal to cause an indicator of the specific energy of the aircraft, relative to the energy range, to be visually displayed using a flight instrument of the aircraft.

18. The system of claim 17, wherein the reference specific energy comprises a sum of the reference ground speed term and the reference height term.

19. The system of claim 17, wherein defining the energy range comprises:

determining a minimum limit as a product of a first gain value and the reference specific energy; and determining a maximum limit as a product of a second gain value and the reference specific energy.

20. The system of claim 17, the operation further comprising:

comparing the specific energy with one or more limits of the energy range; and presenting, when the specific energy exceeds a limit of the energy range, an audiovisual warning using a second flight instrument of the aircraft.

* * * * *